US010902395B1

(12) United States Patent
Knas et al.

(10) Patent No.: US 10,902,395 B1
(45) Date of Patent: Jan. 26, 2021

(54) INTELLIGENT E-BOOK READER INCORPORATING AUGMENTED REALITY OR VIRTUAL REALITY

(71) Applicant: MASSACHUSETTS MUTUAL LIFE INSURANCE COMPANY, Springfield, MA (US)

(72) Inventors: Michal Knas, Monson, MA (US); Payton A. Shubrick, Springfield, MA (US); Damon Ryan DePaolo, Barkhamsted, CT (US); Jiby John, Suffield, CT (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 49 days.

(21) Appl. No.: 16/032,320

(22) Filed: Jul. 11, 2018

Related U.S. Application Data

(60) Provisional application No. 62/530,914, filed on Jul. 11, 2017.

(51) Int. Cl.
| | |
|---|---|
| *G06Q 20/12* | (2012.01) |
| *G06Q 30/06* | (2012.01) |
| *G06F 3/01* | (2006.01) |
| *G06F 3/0483* | (2013.01) |
| *G06F 16/9038* | (2019.01) |
| *H04L 29/06* | (2006.01) |
| *G06T 19/00* | (2011.01) |

(52) U.S. Cl.
CPC .......... *G06Q 20/123* (2013.01); *G06F 3/012* (2013.01); *G06F 3/013* (2013.01); *G06F 3/017* (2013.01); *G06F 3/0483* (2013.01); *G06F 16/9038* (2019.01); *G06Q 30/0641* (2013.01); *G06T 19/006* (2013.01); *H04L 67/38* (2013.01)

(58) Field of Classification Search
CPC .............. G06Q 20/123; G06Q 30/0641; G06F 16/9038; G06F 3/013; G06F 3/0483; G06F 3/017; G06F 3/012; G06T 19/006; H04L 67/38
See application file for complete search history.

(56) References Cited

U.S. PATENT DOCUMENTS

| 8,397,163 B1 | 3/2013 | Sran |
| 8,744,855 B1 | 6/2014 | Rausch |
(Continued)

*Primary Examiner* — Aneeta Yodichkas
(74) *Attorney, Agent, or Firm* — Foley & Lardner LLP

(57) ABSTRACT

Embodiments disclosed herein describe intelligent e-book readers which provide a significant improvement over the conventional e-books that simply render static content. The intelligent e-book readers may customize a rendered e-book based on, for example, the reading level and preferences of the user, the user's social media profile and activity, and current events. Furthermore, the intelligent e-book reader may provide additional augmented reality (AR)/virtual reality (VR) content associated with one or more portions of the rendered e-book. The intelligent e-book reader may also facilitate virtual, real time communication between multiple users and experts. The intelligent e-book reader may also facilitate one or more users to provide feedback and suggestions to authors and future movie-makers. The intelligent e-book reader may automatically determine difficult portions of an e-book based on the virtual communications and/or real time eye-tracking of a user.

20 Claims, 9 Drawing Sheets

(56) References Cited

U.S. PATENT DOCUMENTS

| | | |
|---|---|---|
| 8,832,584 B1 | 9/2014 | Agarwal et al. |
| 9,430,776 B2 | 8/2016 | Puppin |
| 2013/0021373 A1* | 1/2013 | Vaught .................... G06F 3/013 345/633 |
| 2015/0006537 A1 | 1/2015 | Jenkins et al. |
| 2015/0206321 A1* | 7/2015 | Scavezze .................. G06T 7/20 345/633 |
| 2016/0358181 A1* | 12/2016 | Bradski ............ G06Q 20/40145 |
| 2017/0293356 A1 | 10/2017 | Khaderi et al. |

* cited by examiner

INTELLIGENT E-BOOK READER INCORPORATING AUGMENTED REALITY OR VIRTUAL REALITY

CROSS REFERENCE TO RELATED APPLICATIONS

This application claims priority to U.S. Provisional Application No. 62/530,914 filed Jul. 11, 2017, which is herein incorporated by reference.

This application is also related to U.S. Non-Provisional application Ser. No. 15/976,777, filed May 10, 2018, which is incorporated by reference in its entirety.

TECHNICAL FIELD

This application relates generally to an intelligent e-book reader.

BACKGROUND

Present day e-book readers provide a very limited functionality from a user's standpoint. To put differently, conventional e-book readers are merely renderer of simple content, such as books and magazines. The functionality provided by a conventional e-book reader is confined to allowing a user to scroll through the rendered text, to flip through the rendered pages, change the size of the text, to look up dictionary meanings of words of the rendered text, add a bookmark, and highlight or flag various portions of the rendered text. In other words, a user may interact with a conventional e-book reader to just change the look and feel of the content, and the conventional e-book reader fails to tailor the render content based on the user profile. Furthermore, the conventional e-book reader fails to provide additional enhanced content associated with the rendered text. Similarly, there is no integration of social media and community discussion functionality in the conventional e-book reader.

What is therefore desired is an intelligent e-book that provides additional functionality and enhanced content associated with the rendered e-book.

SUMMARY

The systems and methods disclosed herein are intended to address the shortcomings in the art mentioned above, and provide additional or alternative benefits as well. More specifically, embodiments disclosed herein describe intelligent e-book readers which provide a significant improvement over the conventional e-books that simply render static content. The intelligent e-book readers may customize a rendered e-book based on, for example, the reading level and preferences of the user, the user's social media profile and activity, and current events. Furthermore, the intelligent e-book reader may provide additional augmented reality (AR)/virtual reality (VR) content associated with one or more portions of the rendered e-book. The intelligent e-book reader may also facilitate virtual, real time communication between multiple users and experts. The intelligent e-book reader may also facilitate one or more users to provide feedback and suggestions to authors and future moviemakers. The intelligent e-book reader may automatically determine difficult portions of an e-book based on the virtual communications and/or real time eye-tracking of a user.

In an embodiment, a computer implemented method comprises receiving, by a computer system from a user device, a request for an e-book, wherein the request includes an e-book identifier and a user identifier; retrieving, by the computer system from a database, an e-book file based on the e-book identifier, wherein the e-book file includes standard e-book content; retrieving, by the computer system from the database, a user profile based on the user identifier, wherein the user profile includes data records containing information on the reading level and preferences of the user identified by the user identifier; retrieving, by the computer system from the database, a first set of one or more modifying files based on the reading level and preferences of the user, wherein the one or more modifying files include database records including modifying information for modifying one or more sections of the e-book file; generating, by the computer, a modified e-book file by applying modifying information from the one or more modifying files to the e-book file; transmitting, by the computer to the user device, the modified e-book file such that the user device can render the content of the modified e-book file on a user interface of the user device; receiving, by the computer from the user device, a request to update the rendered content wherein the request to modify includes a second reading level indicated by the user; retrieving, by the computer from the database, a second set of one or more modifying files based on the received second reading level; generating, by the computer, a second modified e-book file based upon the modified e-book file and the second set of one or more modified files; and transmitting, by the computer to the user device, the second modified e-book file such that the user device renders the content of the second modified e-book file on the user interface.

In another embodiment, a computer implemented method comprises: receiving, by a computer system, a request from a user to render a customized e-book on an e-book reader; retrieving, by the computer system, one or more customizable e-book files from an e-book database; retrieving, by the computer system, authentication information of the user for one or more social media sites from a user database; querying, by the computer system, the one or more social media using the respective application programming interface to retrieve one or more pieces of information associated with the user; receiving, by the computer system, one or more pieces of information associated with the user; executing, by the computer system, an analytics engine to aggregate the one or more pieces of information with the user; executing, by the computer system, a modification algorithm on the one or more customizable e-book files and the aggregated pieces of information about the user to generate a customized e-book; and rendering, by the computer system, the customized e-book on the e-book reader.

In another embodiment, a computer implemented method comprises: rendering, by a computer system, an e-book on a user device; receiving, by the computer system from a user, a request for an additional information for a portion of the rendered e-book; upon determining by the computer system that the request is a peer to peer chat request: rendering, by the computer system, a chat window on the user device overlaid on the rendered e-book; rendering, by the computer system, one or more chat windows on one or more other user devices rendering the e-book; upon determining by the computer system that the request is a chatbot request: rendering, by the computer system, a chat window on the user device overlaid on the rendered e-book; executing, by the computer system, a chatbot program to chat with the user; and upon determining by the computer system the request is expert chat request; rendering, by the computer system, a chat window on the user device overlaid on the rendered e-book; rendering, by the computer system, one or more chat windows, one or more chat windows on one or more other user devices associated with one or more experts.

In another embodiment, a computer implemented method comprises retrieving, by a computer, an e-book file containing an e-book content and displaying the e-book content on a graphical user interface of the computer; continuously tracking, by the computer through an augmented reality (AR) headset, head movement of a user while reading the e-book content; upon receiving an indication by the computer that the AR headset has captured a head gesture indicating that the user wants additional AR content associated with the displayed e-book content: identifying, by the computer, a portion of the displayed e-book content that the user is currently reading; querying, by the computer, an additional content database to retrieve additional AR content associated with the portion of the displayed e-book content; and transmitting, by the computer, the retrieved additional AR content to be displayed on a screen of the AR headset.

In another embodiment, a system comprises a non-transitory storage medium configured to store a plurality of e-book files and an additional content database; a processor connected to the non-transitory storage medium and configured to: retrieve from the non-transitory medium, an e-book file containing an e-book content and display the e-book content on a graphical user interface; continuously track computer through an augmented reality (AR) headset, head movement of a user while reading the e-book content; upon receiving an indication by the processor that the AR headset has captured a head gesture indicating that the user wants additional AR content associated with the displayed e-book content: identify a portion of the displayed e-book content that the user is currently reading; query the additional content database to retrieve additional AR content associated with the portion of the displayed e-book content; and transmit the retrieved additional AR content to be displayed on a screen of the AR headset.

In another embodiment, a computer readable non-transitory medium contains one or more computer instructions, which when executed by a processor cause the processor to: retrieve an e-book file containing an e-book content and display the e-book content on a graphical user interface; continuously track computer through an augmented reality (AR) headset, head movement of a user while reading the e-book content; upon receiving an indication by the processor that the AR headset has captured a head gesture indicating that the user wants additional AR content associated with the displayed e-book content: identify a portion of the displayed e-book content that the user is currently reading; query an additional content database to retrieve additional AR content associated with the portion of the displayed e-book content; and transmit the retrieved additional AR content to be displayed on a screen of the AR headset.

BRIEF DESCRIPTION OF THE DRAWINGS

The accompanying drawings constitute a part of this specification and illustrate embodiments of the subject matter disclosed herein.

DETAILED DESCRIPTION

Figure 1:
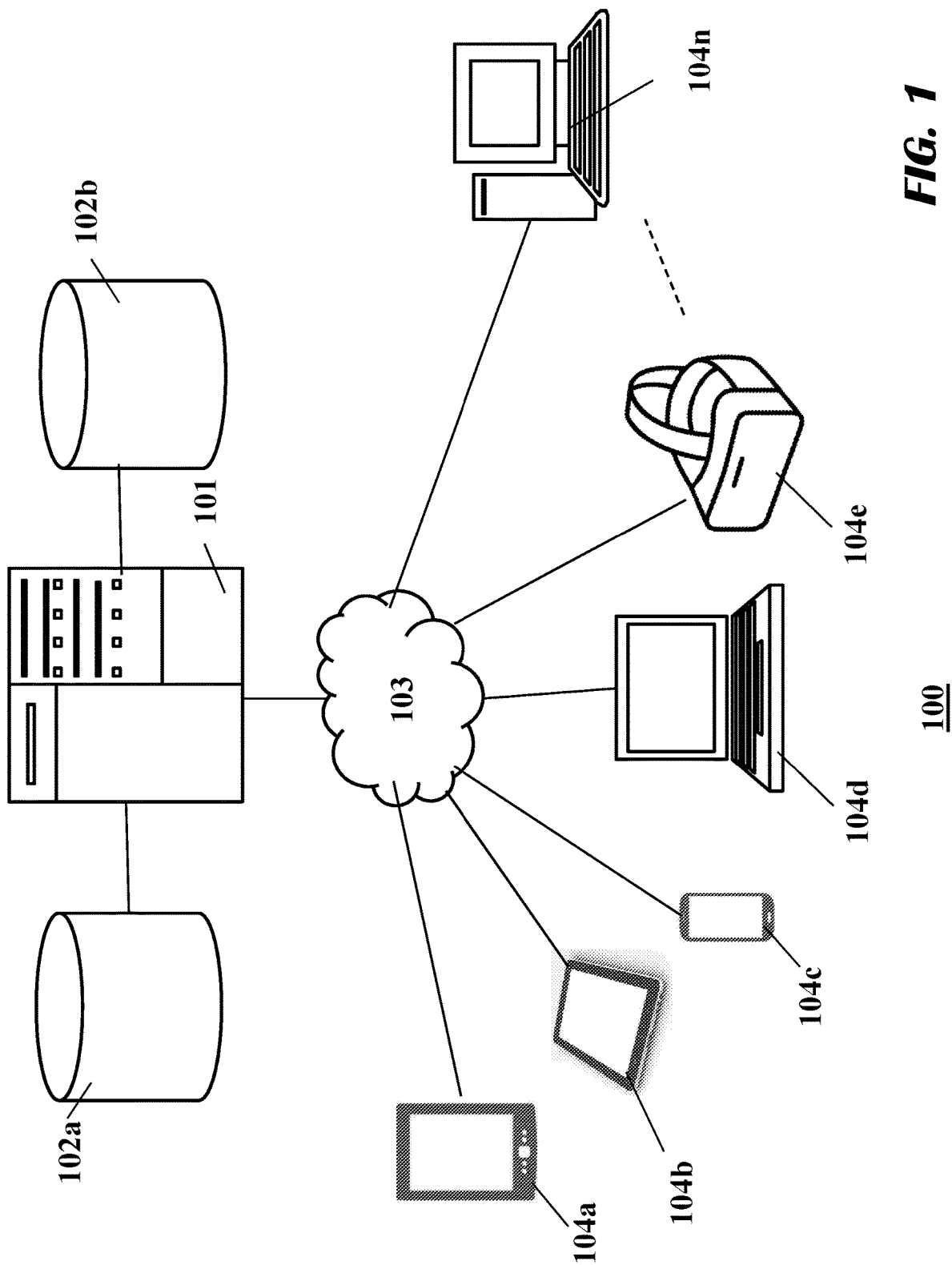
FIG. 1 shows an exemplary system, according to an exemplary embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

Embodiments disclosed herein describe an intelligent e-book reader (alternatively intelligent e-reader) that breaks the traditional e-book paradigm of rendering a static content and allowing a user a limited interaction with the static content. In other words, the intelligent e-book reader integrates interactive functionality and provides additional enhanced content associated with the rendered e-book. One having ordinary skill in the art understands that the intelligent e-book reader may not simply refer to a handheld e-reader, but includes server side computing systems, client side computing systems that may include a handheld e-reader, and one or more networks interconnecting the server side computing systems and client side computing systems. One having ordinary skill in the art further understands that the various functionalities in the embodiments disclosed herein can be implemented in the server side computing systems, client side computing systems, or a combination of both.

In an embodiment, the intelligent e-book reader renders an e-book or any other additional content based on the user profile of the user associated with the intelligent reader. For example, the intelligent e-book reader may maintain a user profile database containing a user profile of a user associated with the intelligent e-book reader. The user profile may contain database records indicating the reading level and preferences of the user. The intelligent e-book reader may further maintain an e-book database containing a plurality of e-books. When the user inputs a request to render an e-book, the intelligent e-book reader may query the user profile database to retrieve the user profile containing the reading level and the preferences of the user. The intelligent e-book reader may then query the e-book database to retrieve the e-book customized according to the reading level and preferences of the user. For example, the e-book for juvenile readers may include simpler words and simpler sentence structures, whereas the e-book for a specialist may include complex text and ideas. In addition, the intelligent e-book may "grow" with the user—the intelligent e-book reader may continuously aggregate the data of the reading level of the user, and automatically update the reading level of the user, and retrieve and render e-books books based upon the updated the reading level. In other words, the intelligent e-book reader may render e-books with increasing complexity and sophistication as the user reading and comprehension skills improve.

In an embodiment, the intelligent e-book reader may incorporate social media functionality, using which a user may talk to an expert, do a chat, or get additional information. For example, a user may instruct the intelligent e-book reader to open a chat window overlaid on a portion of an e-book. In the chat window, the user may type a question regarding the portion of the e-book. The intelligent e-book reader may transmit the question to other readers who are reading or have read the e-book. For example, the intelligent e-book reader may open a group chat session, wherein the user can get assistance understanding the portion in real time from other readers/users. Some of the other users may be labeled as experts, and the user may directly ask a question about a difficult portion of the e-book to the experts. In addition or in the alternate, the e-book may be associated with a chatbot, and the chatbot may automatically answer the question posed by the user without any human intervention. These features may especially useful for students reading textbooks using the intelligent e-book reader. For example, a professor may assign a portion of a textbook, and chances are the students may be reading the portion of the text in the same time frame. Whenever a student has a question, the student may open a chat window overlaid on the portion and the intelligent e-book reader may open the chat window, based on the personal settings, in the respective devices of other students. The intelligent e-book reader may then facilitate a discussion about the portion of the textbook using the chat window. The intelligent e-book reader may also flag a portion, based on the frequency and the content of the chat, of the textbook and automatically transmit a message to the assigning professor that students found the portion particularly difficult. The professor may then address the difficult portion in a later class.

In an embodiment, the intelligent e-book reader may use the eye tracking to determine difficult portions of a rendered e-book. For example, the intelligent e-book reader may activate one or more camera modules in the user device to track the eye movement of the user through technologies such as image processing and/or infrared reflection tracking. Based on the eye tracking, the intelligent e-book reader may determine the portions (words, phrases, sentences, paragraphs) that the user reads and rereads. Based upon the amount of rereads the intelligent e-book reader may determine that such portions of the e-book may be difficult for the user or any other user. Once the intelligent e-book reader determines that a particular portion of the e-book is difficult, the intelligent e-book reader may tag the difficult portions using features such as flags and highlights. The tags may allow an expert to input explanations associated with the difficult portions to aid the future readers. Furthermore, the tags may allow future readers to anticipate the difficulty and read the difficult portions with more attention compared to the other portions. In a classroom setting, the tag may help a teacher/professor to prepare for a lecture addressing tagged portion of the e-book.

In an embodiment, the intelligent e-book reader may provide purchase options associated with the e-book to the user. For example, the portion of the e-book may describe and detail a consumer good that the user may want to purchase. A main character in the e-book may, for example, wear a particular brand of shoes and a particular brand of eyeglasses. As the user is reading the portion (the page or paragraph) of the e-book that describes the items, the intelligent e-book reader may render a window overlaid on the portion of the e-book with a link to purchase such items. The intelligent e-book reader may provide a seamless purchase process that the user does not have to leave the e-book but may simply click the link, and the intelligent e-book reader may automatically communicate with the vendor and the user's bank in the background to automatically order the item for the user.

In an embodiment, the intelligent e-book reader may allow the user to provide a feedback to an author. As the user reads the e-book, the user may indicate to the intelligent e-book reader that the user wants to provide a feedback by engaging one or more input mechanisms, such as an on-screen icon or a physical button, provided by the intelligent e-book reader. In response to the aforementioned user indication, the intelligent e-book reader may overlay a feedback window or may provide any other mode of input for the user to provide a feedback about the portion of the book. The feedback may include, for example, the user's suggestion to the author about potential changes to the story or the text in the e-book. As another example, the feedback may include the user's suggestions for a sequel or a prequel of the story being told in the e-book. As yet another example, the feedback may include suggestions based on current events or current fan fiction associated with the e-book.

In an embodiment, the intelligent e-book reader may integrate an incentive process for the users to provide answers to questions posed by other users. For example, the intelligent e-book may execute a reward engine that that may provide reward points to a user based on the user's involvement in helping other users. A user may answer questions posed in a chat-room or a community forum or write explanations to difficult portions of the e-book. Based on the quantity and the quality of these answers, the intelligent e-book reader may provide reward points. Other users may rank and rate the answers or additional material provided; and the intelligent e-book reader may provide rewards based upon these ratings and rankings. In addition to the rewards and points, the intelligent e-book reader may also provide badges to the users providing answers and/or additional material. For example, a user may receive an "expert" badge such that other users may take the badge as a symbol of credibility.

In an embodiment, the intelligent e-book reader may integrate the social media account of a user with a rendered e-book. For example, the intelligent e-book reader may use an application programming interface (API) of the user's one or more social media accounts to retrieve and aggregate various social media information about the user. The various social media information may include, for example, the user's profession, the names of the user's closest friends and relatives, the user's hobbies, or the user's favorite items. When rendering a requested e-book, the intelligent e-book reader may populate various portion of the requested e-book with the aggregated social media information of the user. For example, the main character may be named after the user and the main character may share the same hobbies as the user.

In an embodiment, the intelligent e-book reader may integrate the functionality of an augmented reality (AR) or virtual reality (VR) in a reading environment. The user may read an e-book rendered a handheld device while having an AR/VR headset on. In some instances, the user may be reading a physical paper book. One having ordinary skill in the art understands that a pass-through camera may allow a user to read the e-book on a handheld device or a physical book while the user may have AR/VR headset on. In other instances, the e-book may be rendered on the AR/VR headset itself and the user may interact with the e-book on the headset itself such as flipping the virtual pages within the AR/VR headset. Regardless of where the e-book is rendered or whether the reader is looking at an e-book or a physical book, the user may indicate that the user seeks additional content on the portion of the book the user is reading. For example, while reading an e-book on a handheld device, the user may look up and look towards a wall. The intelligent e-book reader may continuously track the user's head movement and/or eye movement to determine that that the user seeks additional content based upon the head movement and/or eye movement of the user. For example, the looking up towards the wall may indicate the intelligent e-book reader that the user is seeking additional content. In some instances, the user may press a physical button on the handheld device or the AR/VR headset to indicate that the user seeks additional content. Upon receiving the indication from the user, the intelligent e-book reader may query an additional content database, which may be within the e-book database, to retrieve the additional content associated with the portion of the e-book (or the physical book) that the user is reading. The intelligent e-book reader may render the additional content on the AR/VR headset. As an example, if the user is reading a book about a war, the additional content may include a battle map, pictures of the soldiers and the officers, pictures of the weapons used, and/or newsreel footage of the war. Therefore, as the user is reading an e-book, the user may look up and the intelligent e-book reader may provide additional AR/VR content associated with the portion of the e-book the user is reading.

In an embodiment, the intelligent e-book reader may facilitate the user to provide suggestions for a movie based on the e-book. The user may indicate to the intelligent e-book reader, through an on-screen gesture or by pressing a physical button, that the user wants to provide a suggestion for a movie based on the e-book being rendered. The intelligent e-book reader may then render a window overlaid on the e-book or any other input mechanism such that the user can input the suggestions. The suggestions may include, a particular street to shoot a particular scene, a suggestion about a town to shoot the movie on, suggested actors, or suggested directors. The intelligent e-book reader may aggregate suggestions from various users and may generate a report to be potentially used by the movie producers. In other words, the report may inform the movie producers as to how the public wants the book to be visualized in the movie.

FIG. 1 shows an exemplary system 100, according to an exemplary embodiment. The system 100 may comprise one or more servers 101, one or more databases 102, a communication medium 103, and one or more user devices 104. The one or more user devices 104 may comprise an e-book reader or a device having an e-book application installed thereon. One having ordinary skill in the art appreciates that the system 100 is not confined to the components described herein and may comprise additional or alternate components, which are to be considered within the scope of the exemplary embodiment. Furthermore, functionality attributed to a component of the exemplary system 100 may be fully or partially executed by other components of the system 100.

The servers 101 of the exemplary system 100 may execute various software modules that instruct the servers 101 on performing one or more processes for receiving data from various devices, storing the received data in the databases 102, retrieving data stored in databases 102, and performing various operations on the retrieved data. A server 101 may be any computing device comprising non-transitory machine-readable storage media and a processor capable of executing the various processes and tasks described herein. Non-limiting examples of a server 101 may include a server computer, a desktop, a laptop, a tablet, or the like. In some cases, the server 101 may be coupled to the databases 102 of the system 100, and, in some cases, the server 101 may host the one or more databases 102.

In some embodiments, a server 101 may host an application server or webserver, either of which may include software modules allowing the user devices 104 to access and/or manipulate data in a database 102 or in the server 101. For example, the server 101 may comprise a webserver allowing the user devices 104 to access data that is collected and manipulated by the server 101. In this example, a subscriber to the system 100, who may be operating a user device 104a, may point a web browser application executed by the user device 104a to a website hosted on the webserver in order to access the data stored in the database 102 and results generated by the server 101. In another example in which the server 102 comprises a web-accessible application server, a user device 104c may be a mobile device (e.g., a dedicated e-book reader, tablet, laptop, smart phone) executing a software application configured to access the system 100.

The databases 102 may store various e-books that can be accessed from the user devices 104 and user profiles of a plurality of users using the system. The database 102 may store the e-books in various formats, such as plaintext, a Portable Document Format (PDF), Hypertext Markup Language (HTML), Extensible Markup Language (XML), Microsoft Word (MS-Word), International Electrotechnical Commission (IEC) 62448 standard, Information Presentation Facility (IPF), Kindle File Format, Mobipocket, Rich Text Format (RTF), Open XML Paper Specification (OpenXPS), and/or any type of text displaying or processing/format standard that are compatible with the user devices 104. In addition to the text of the e-books, the database 102a may also store one or more multimedia files related to the text of the e-books. The database 102a may store reading level based e-book files such that the system 100 may render an e-book based on a user's reading level and preferences. In some embodiments, the database 102a may store an e-book file containing a text at a standard reading level; and may store one or files containing modifications to the e-book file text based on the reading level and preferences of the users. For example, a standard text for an e-book may contain a text containing highly technical information and the e-book file may contain the standard text containing the highly technical information. The database 102a may store, for example, two files for the e-book based on lower reading levels. The database 102a may store a first file containing modifications to the standard text to support a user at a first reading level. For example, the first file may contain replacement for jargons and/or technical words. Furthermore, the first file may contain simple explanations of mathematical expressions in the standard text. A second file may contain modifications to the first file or the standard text. Using the second file, the system 100 may support a user at a lower second reading level compared to the first reading level. In the embodiments where the second file contains modifications to the first file, the second file may contain the text simplifying information in the first file. The second file may include, for example, simpler words and shorter sentences compared to the first file. In some embodiments, the database 102a may contain separate files based on the reading levels and preferences, as opposed to containing a standard text and one or more files containing modifications thereto. In these embodiments, the server 101 may retrieve the appropriate file based on a user's reading level and preferences.

The database 102a may store a thesaurus file and the server 101 may use the thesaurus file for modifying a standard text e-book file. For example, the thesaurus file may have synonyms categorized according to reading levels. After the server 101 identifies and/or determines a reading level and preferences of a user, the server 101 may access the thesaurus file and the standard e-book file and replace a plurality of complex words in the standard e-book file with the synonyms at the appropriate reading level from the thesaurus file. One having ordinary skill in the art understands that using a thesaurus file is merely exemplary, and the system 100 may use any other algorithm to tailor the e-book based on a user's reading level and preferences.

The database 102a may further include additional content associated with the e-books stored therein. In some embodiments, the additional content may include augmented reality (AR) or virtual reality (VR) contents stored in association with one or more portions of the various e-books. The AR/VR contents may be rendered by an AR/VR headset 104e. The AR/VR content may be associated with the portion of the e-book that the user is reading. For example, if the user is reading a book about the battle, the AR/VR content may include map of the battlefield, photographs of the soldiers and officers, and/or newsreel footages of the war. In operation, when the user indicates, through a head gesture or by pressing a button, that the user seeks additional AR/VR content, the system 100 may render the AR/VR content the AR/VR headset 104e.

A database 102b may store user profiles of the users associated with the user devices 104. A user profile may include data records containing a plurality of information of the corresponding user. For example, a user profile may include data records containing information on the e-books the user has read. The user profile may include data records containing user preferences explicitly entered by the user and/or algorithmically determined by the system 100. For instance, a user may indicate his or her reading level, or the system 100 may determine the user's reading level based on the user's e-books usage history such as the reading level of the e-books the user frequently reads. The system 100 may dynamically update the user profile based on the reading activity or other inputs from the associated user.

The communication medium 103 may be any type of communication medium such as a local area network (LAN), metropolitan area network (MAN), and/or a wide area network (WAN). For instance, the communication medium 103 may be the internet. The communication medium 103 may be a combination of various wired and wireless links capable of carrying data packets in between the server 101 and the user devices 104.

The user devices 104 devices may be any type of computing devices used by one or more users of the system 100. Non limiting examples of user devices may be a dedicated e-book reader 104a, a tablet computer 104b, a smart phone 104c, a laptop computer 104d, an augmented reality (AR)/virtual reality (VR) headset 104e and a desktop computer 104n. The dedicated e-book reader 104a may run an e-book operating system and one or more e-book applications that may access the server 101 and the database 102. Other devices may run their respective operating systems and one or more e-book applications that may access the server 101 and the database 102.

In an exemplary operation, the server 101 may receive a request for an e-book from a user device 104. The request may include an e-book identifier that the server 101 may use to query the database 102a to retrieve a standard e-book file. The request may further include a user identifier of the user associated with the user device 104. The server may use the user identifier to query the database 102b to the retrieve a user profile of the user associated with the user identifier. The user profile may contain data records indicating the reading level of the user and/or the user's preferences. Based on the reading level and/or user's preferences, the server 101 may retrieve one or more modifying files containing database records having information on modifying the standard e-book file. The modifying files may be in various formats, such as plaintext, a Portable Document Format (PDF), Hypertext Markup Language (HTML), Extensible Markup Language (XML), Microsoft Word (MS-Word), International Electrotechnical Commission (IEC) 62448 standard, Information Presentation Facility (IPF), Kindle File Format, Mobipocket, Rich Text Format (RTF), Open XML Paper Specification (OpenXPS), and/or any type of text displaying or processing standard/format. The modifying files may be delta files containing database records for modifying one or more portions of the standard e-book file. In some embodiments, the modifying files may include database records containing rules for adjusting e-book content stored in the e-book files based on reading levels. The server 101 may apply the one or more modifying files to the standard e-book file to generate a modified e-book. The server 101 may transmit the modified e-book to the user device 104 such that the user device 104 may render the content of the modified e-book on the user interface of the user device 104. The server 101 may receive a request to change the reading level of the modified e-book being rendered on the user interface of the user device. Based on the request, the server 101 may query the database 102a to retrieve a second set of one or more modifying files. The server 101 may apply the information in the database records in the second set of one or more modifying files to the standard e-book file or the modified e-book file to generate a second modified e-book file. The server 101 may transmit the second modified e-book file to the user device 104 such that the user device 104 may render the contents of the second modified e-book file. Therefore, the user can dynamically customize the reading level of the e-book rendered on the user device 104.

Figure 2:
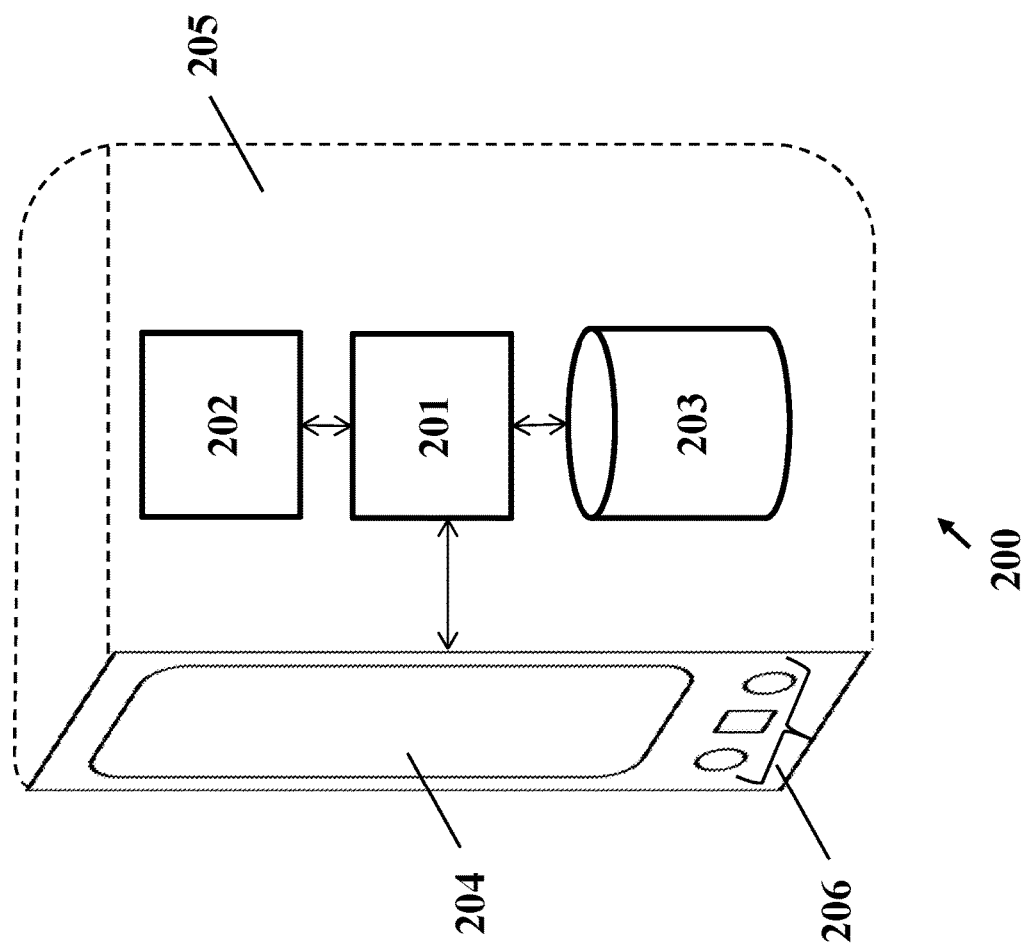
FIG. 2 shows an exemplary e-book reader, according to an exemplary embodiment.

FIG. 2 shows an exemplary e-book reader 200, according to an exemplary embodiment. Various components of the e-book reader 200 may be enclosed in a housing 205. Exemplary components of the e-book reader 200 may include a processor 201, a memory 202, a storage 203, a user interface 203, and interactive buttons 206. A person ordinary skilled in the art understands that these components are merely exemplary and one or more components may be substituted for other components, and one or more components may be added to or subtracted from the components described herein.

The processor 201 may be any kind of processor capable of executing software modules to achieve the functionality of the e-book reader. Non limiting examples of the processor 201 may include a microprocessor or an application specific integrated circuit (ASIC). The processor 201 may execute an operating system stored as software modules in the storage 203 and loaded onto the memory 202. Furthermore, the processor may execute software modules for one or more applications installed in the e-book reader 200. The memory 202 may be any type of memory which the processor 201 may use to load software programs and database records during the runtime of the operating system of the e-book reader 200. For example, the memory 202 may be a random access memory (RAM) chip.

The storage 203 may be any type of storage containing an e-book database. Non-limiting examples of the storage are hard drives and flash drives. The storage 203 may store various e-books that can be accessed by a user of the e-book reader 200. The storage 203 may store the e-books in plaintext format, a portable document format (PDF), and/or any type or text rendering or word processing standard that are compatible with the e-book reader 200. In addition to the text of the e-books, the storage 203 may also store one or more multimedia files related to the text of the e-books. The storage 203 may store reading level based e-book files such that the e-book reader 200 may render an e-book based on a user's reading level and preferences. In some embodiments, the storage 203 may store an e-book file containing a text at a standard reading level; and may store one or files containing modifications to the e-book file text based on the reading level and preferences of the users. For example, a standard text for an e-book may contain a text containing highly technical information and the e-book file may contain the standard text containing the highly technical information. The storage 203 may store, for example, two files for the e-book based on lower reading levels. The storage 203 may store a first file containing modifications to the standard text to support a user at a first reading level. For example, the first file may contain replacement for jargons and/or technical words.

Furthermore, the first file may contain simple explanations of mathematical expressions in the standard text. A second file may contain modifications to the first file or the standard text. Using the second file, the e-book reader 200 may support a user at a lower second reading level compared to the first reading level. In the embodiments where the second file contains modifications to the first file, the second file may contain the text simplifying information in the first file. The second file may include, for example, simpler words and shorter sentences compared to the first file. In some embodiments, the storage 203 may contain separate files based on the reading levels and preferences, as opposed to containing a standard text and one or more files containing modifications thereto. In these embodiments, the processor 201 may retrieve the appropriate file based on a user's reading level and preferences.

The storage 203 may store a thesaurus file and the processor 201 may use the thesaurus file for modifying a standard text e-book file. For example, the thesaurus file may have synonyms categorized according to reading levels. After the processor 201 identifies and/or determines a reading level and preferences of a user, the processor 201 may access the thesaurus file and the standard e-book file and replace a plurality of complex words in the standard e-book file with the synonyms at the appropriate reading level from the thesaurus file. One having ordinary skill in the art understands that using a thesaurus file is merely exemplary, and the e-book reader 200 may use any other algorithm to tailor the e-book based on a user's reading level and preferences.

The storage 203 may store a user profile of the user associated with the e-book reader 200. A user profile may include data records containing a plurality of information of the user. For example, a user profile may include data records containing information on the e-books the user has read. The user profile may include data records containing user preferences explicitly entered by the user and/or algorithmically determined by the e-book reader 200. For instance, a user may indicate his or her reading level, or the e-book reader 200 may determine the user's reading level based on the user's e-books usage history such as the reading level of the e-books the user frequently reads. The e-book reader 200 may dynamically update the user profile based on the reading activity or other inputs from the associated user.

The user interface 204 may be any kind of interface capable of rendering e-book text and associated multimedia. Non limiting examples of the user interface include an LCD screen, an LED screen, and a plasma screen. The user interface 204 may allow a touchscreen access deploying touchscreen technology known to one having ordinary skill in the art. The housing 205 may be of any type of material such as plastic, metals, and alloys. The interactive buttons 206 may allow the user to navigate through various pages rendered by the user interface. For example, the interactive buttons 206 may allow the user to flip the pages of the rendered e-book, increase or decrease the size of the text, and highlight various portions of the text. Furthermore, the interactive buttons 206 may allow the user to enter and/or modify the user's reading level and the preferences.

In operation, the processor 201 may receive a request for an e-book from a user through the user interface 204 and/or the interactive buttons 206. The request may include an e-book identifier that the processor 201 may use to query the storage 203 to retrieve a standard e-book file. The processor may further query the storage 203 to retrieve a reading level of the user and/or the user's preferences. Based on the reading level and/or user's preferences, the server 201 may retrieve one or more modifying files containing database records having information on modifying the standard e-book file. The processor 201 may apply the one or more modifying files to the standard e-book file to generate a modified e-book file. The processor 201 may transmit the content of the modified e-book file to the user interface 204 for rendering the content to the user. The processor 201 may receive a request to change the reading level of the modified e-book being rendered on the user interface 204. Based on the request, the processor 201 may query the storage 203 to retrieve a second set of one or more modifying files. The processor 201 may apply the information in the database records in the second set of one or more modifying files to the standard e-book file or the modified e-book file to generate a second modified e-book file. The processor 201 may transmit the contents of the second modified e-book file to the user interface 204 such that the user interface may render the received contents on the user interface 204.

Although FIG. 1 shows an exemplary client server system 100 and FIG. 2 shows an exemplary e-book reader 200, one having ordinary skill in the art understands that a similar functionality can be achieved by an exemplary system which combines aspects of system 100 with the e-book reader 200. In other words, one or more functions at the server 101 side of the system 100 may be achieved at one or more client devices 104 and one or more functions of the e-book reader 200 may be achieved at one or more servers communicating with the e-book reader 200.

Figure 3:
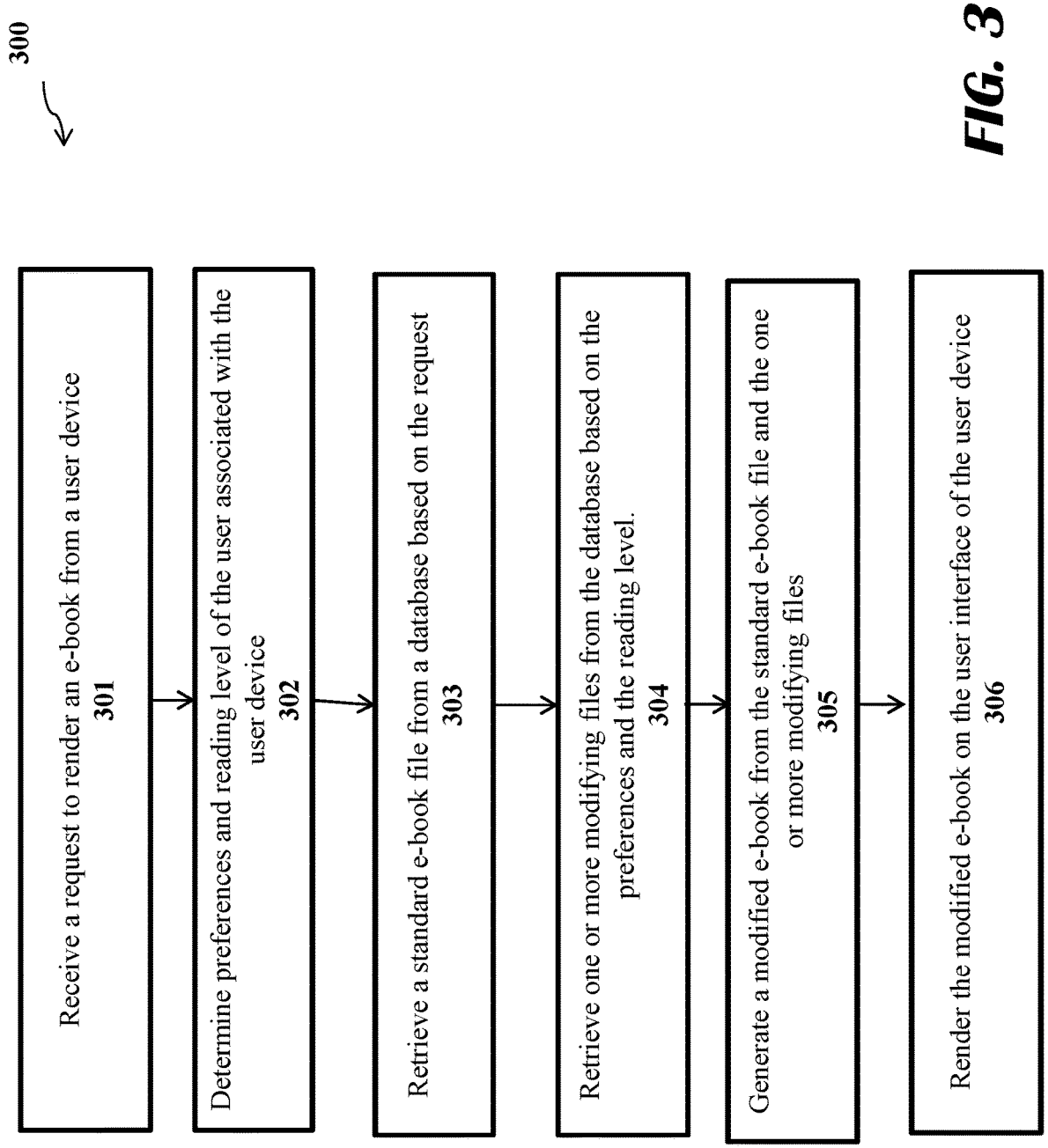
FIG. 3 shows an exemplary method of rendering a customized e-book on a user device, according to an exemplary embodiment.

FIG. 3 shows an exemplary method 300 of a customized rendering of an e-book on a user device, according to an exemplary embodiment. Although multiple computer systems and multiple databases may implement the various steps of the method 300, the following description describes, for brevity, a computer system and a database implementing the method 300. One having ordinary skill in the art understands that the computer system and the database may be on the server side, on the client side, and/or a combination of the server side and the client side. One having ordinary skill in the art further understands the one or more steps of the method 300 may be omitted or substituted and other steps may be added to the method 300 without deviating from the scope of this disclosure.

In a first step 301, the computer system may receive a request to render an e-book from a user device. For example, a user may select an e-book in a user interface provided by a dedicated e-book reader or in an e-book application running on a tablet computer. Alternatively, the user may search for e-books in a search engine and select the e-book from the search results rendered in the user interface. One having ordinary skill in the art understands that the computer system may receive the request to render the e-book from other communication channels such as text message or a command line interface (CLI). Regardless of the communication channel, the computer system may receive one or more identifiers and/or pointers identifying the e-book.

In a next step 302, the computer system may determine preferences and reading level of the user associated with the user device. In some embodiments, the user may select one or more preferences and/or the reading level while requesting an e-book to rendered on the user device. In other embodiments, the computer system may retrieve a user profile from the database to determine the preferences and the reading level of the user. In the embodiments wherein the user does not specify a preference or a reading level, the computer system may aggregate information from various user profiles to generate a standard set of preferences and a standard reading level.

In a next step 303, the computer system may retrieve a standard e-book file from the database based on the request. For example, the computer system may query the database with the received identifier and/or pointer to retrieve the standard e-book file from the database. The e-book file may be in any format such as a plaintext file or a PDF file. Furthermore, the e-book file may include multimedia components such as audio, video, and/or animated text.

In a next step 304, the computer system may retrieve one or more modifying files from the database based on the preferences and the reading level of the user associated with user device. For instance, the computer system may query the database using the preference information and/or reading level information with the identifier of the standard e-book file to retrieve the one or more modifying files. In some embodiments, the modified files may contain software codes and data records to modify the content of the standard e-book file. For example, the one or more modifying files may contain replacement words, replacement sentences, and/or replacement paragraphs for one or more sections in the standard e-book file. For example, a modifying file may include a thesaurus with words arranged according to reading levels.

In a next step 305, the computer system may generate a modified e-book from the standard e-book file and the one or more modifying files. For instance, the computer system may use the replacement words, replacement sentences, and/or replacement paragraphs to replace one or more sections in the standard e-book file. In a thesaurus based modification, the computer system may identify the reading levels of a plurality of words in the standard e-book file, and identify the replacement words in the thesaurus file. The computer system may then use replace higher reading level words in the standard e-book file with lower reading level words from the thesaurus file.

In a next step 306, the computer system may render the modified e-book on the user interface of the user device. In the embodiments wherein the computer system is a server computer, the computer system may use a communication network to transmit the generated modified e-book file to the user device. The user device may then receive the modified e-book file and render the contents of the e-book file on the user interface. In the embodiments wherein in the computer system is a client computer (for example, including the processor and memory of the user device), the computer system may transmit one or more instructions to the Graphical Processing Unit (GPU) to render the contents of the modified e-book file on the user interface of the user device.

In some embodiments, the computer system may receive a request to change the reading level of the e-book displayed on the user device. The request may include a new desired reading level. Based on the new desired reading level, the computer system may retrieve a second set of one or more modifying files from the database. The computer system may apply modifying information in the database records of the second set of one or more modifying files on the standard e-book file or the modified e-book file to generate a second modified e-book file. The computer system may transmit the second modified e-book file to the user device to render the contents of the second modified e-book file on the user interface of the user device.

Figure 4:
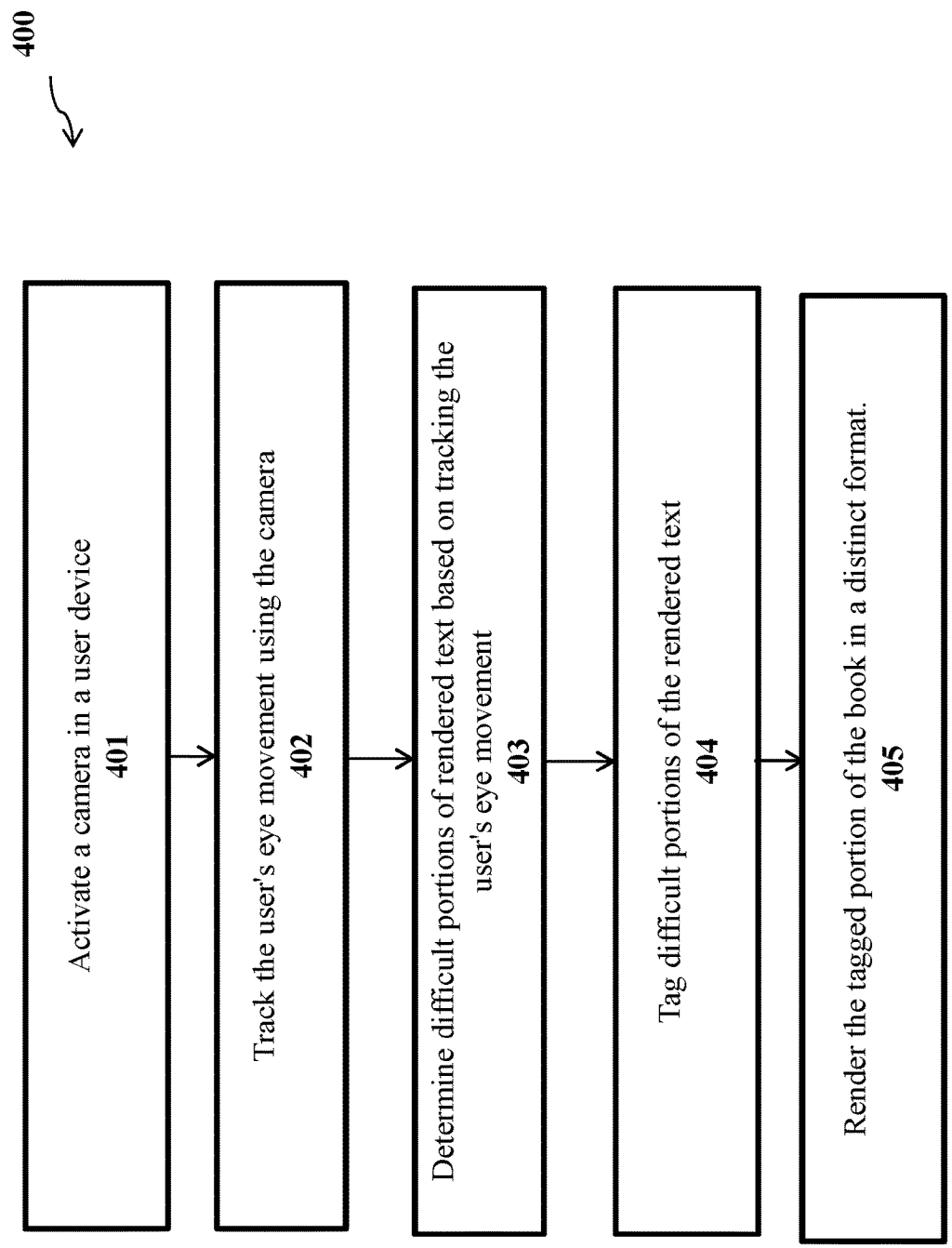
FIG. 4 shows an exemplary method of tagging a difficult portion of a rendered e-book, according to an exemplary embodiment.

FIG. 4 shows an exemplary method 400 of an intelligent tracking of a user behavior, according to an exemplary embodiment. Although multiple computer systems and multiple databases may implement the various steps of the method 400, the following description describes, for brevity, a computer system and a database implementing the method 400. One having ordinary skill in the art understands that the computer system and the database may be on the server side, on the client side, and/or a combination of the server side and the client side. One having ordinary skill in the art further understands the one or more steps of the method 400 may be omitted or substituted and other steps may be added to the method 400 without deviating from the scope of this disclosure.

In a first step 401, the computer system may activate a camera in a user device. Non limiting examples of the user device may be a dedicated e-book reader, a smartphone, a tablet, a laptop computer, or a desktop computer. In some embodiments, the computer system may activate the camera all the time when the user device is turned on or when the e-book application is running. In other embodiments, the computer system may activate the camera in the user device in response to an event, for example, the user turning to a page containing a particularly complex matter. One having ordinary skill in the art understands that the camera may include one or more camera modules. Non limiting examples of the camera modules include optical camera and infrared cameras.

In a next step 402, the computer system may track the user's eye movement using the camera. For example, the computer system may implement the pupil center corneal reflection (PCCR) technology to track the user's eye movement. One having ordinary skill in the art understands that the PCCR technology may include an infrared light source that direct an infrared beam towards the user's eyes, and thereafter use an infrared camera to capture the reflection of the aforementioned beam from the user's eyes. Based on measuring the captured reflection, the computer system may track the movement of the user's eyes.

In some embodiments, the computer system track the movement of the user's eyes using an optical camera and image processing. For example, an optical camera module in the user's device may continuously take pictures of the user's eyes and the computer system may track the movement of the eyes based on applying one or more movement tracking algorithms to the stream of the pictures. One having ordinary skill in the art understands that these technologies are merely exemplary, and the computer system may use any number of eye tracking technologies. Regardless of the technology, the computer system may record the eye position (point of gaze) and the movement of the eyes in the two dimensional screen of the user device. For example, the computer system may store in the database, time stamped position of the eyes in a page of text and/or images.

In a next step 403, the computer system may determine difficult portions of rendered text based on tracking the user's eye movement. For example, the computer system may determine that the user had read a phrase, a sentence, and/or a paragraph multiple times. As another example, the computer system may determine that the user has gazed at a word and/or a phrase for a long time. As yet another example, the computer system may determine that the user stopped reading in the middle of a sentence or a middle of the paragraph or skipped reading the remainder of a sentence and/or a paragraph.

In a next step 404, the computer system may tag difficult portions of the rendered text. For example, the computer system may store in the database records of the rendered book, a flag or a tag that the specific portion of the book has been found difficult by various readers. The tagging may be based upon collective activity of the various readers. For example, if the timing is above a threshold or the number of readers is above a threshold.

In a next step 405, the computer system may render the tagged portion in a distinct format. For example, in a teaching environment wherein the user is a student reading an assigned text, the professor may open up the assigned text using the professor's device. In the professor's device, the computer system may highlight the portions that have been tagged difficult such that the professor may address the difficult portion in a subsequent class. In other settings, the computer system may highlight the difficult portions such that the subsequent readers are alerted about the difficulty of the portion. The subsequent readers may then read the tagged sections more carefully or seek additional help to understand the difficult portions. Furthermore, the tagged portions allow one or more experts to provide additional material in association with the difficult portion to help the future reader understand the difficult portions.

Figure 5:
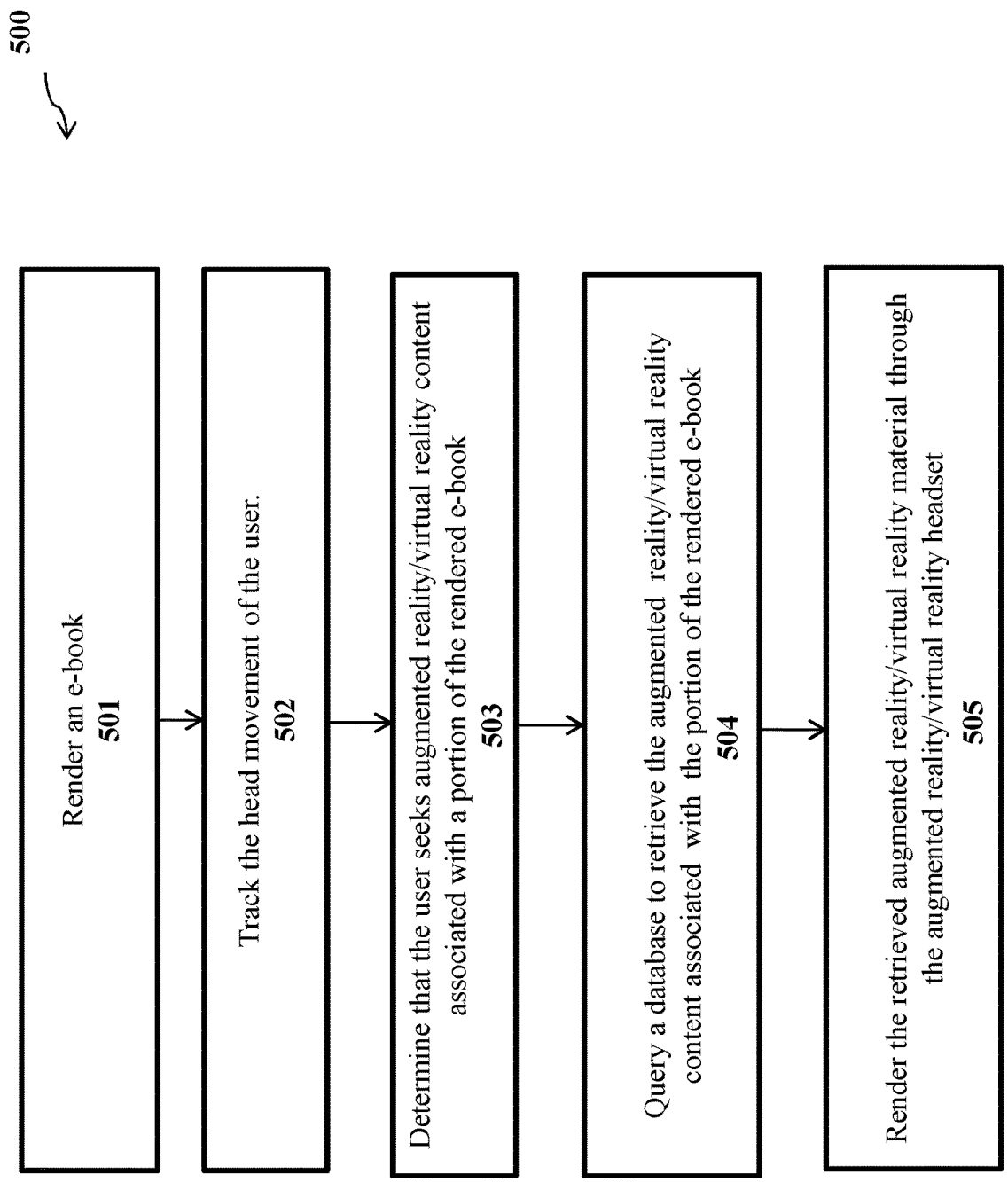
FIG. 5 shows an exemplary method of rendering additional augmented reality (AR)/virtual reality (VR) content in association with an e-book, according to an exemplary embodiment.

FIG. 5 shows an exemplary method 500 for rendering augmented reality (AR) and/or virtual reality (VR) content in associated with e-books, according to an exemplary embodiment. Although multiple computer systems and multiple databases may implement the various steps of the method 500, the following description describes, for brevity, a computer system, an e-book database, and a user database implementing the method 500. One having ordinary skill in the art understands that the computer system and the databases may be on the server side, on the client side (for example, an e-book reader), and/or a combination of the server side and the client side. One having ordinary skill in the art further understands the one or more steps of the method 500 may be omitted or substituted and other steps may be added to the method 500 without deviating from the scope of this disclosure.

In a first step 501, the computer system may render an e-book. In some implementations, the computer system may render the e-book on the screen of a user device such as a dedicated e-book reader, a smartphone, a tablet computer, a laptop computer, or a desktop computer. In some implementations, the computer system may render the e-book on the screens of a virtual reality (VR) or an augmented reality (AR) headset. In some embodiments, the computer system may customize the rendered e-book based on a user profile of a user associated with the aforementioned user devices. For example, the computer system may render the e-book with a customized level of difficulty based upon the user profile. Furthermore, the computer system may render the e-book with customized text and/or customized graphics based upon the user profile. In some embodiments, the computer system may not render the e-book and the user may be reading a physical paper based book.

In a next step 502, the computer system may track the head movement of the user. For example, the user may be wearing a VR or an AR headset. The computer system may activate one or more accelerometers and gyroscopes within the VR/AR headset to track the head-movement of the user. The computer may receive orientation and movement information from the accelerometers and the gyroscopes to track the head movement of the user. In addition to the tracking the head movement, the computer system may track the eye movement of the user using one or more cameras of one or more user devices, such as smartphones and/or VR/AR headsets. The tracking of the head movement (or additionally eye movement) may allow the computer system to determine whether the user is reading the e-book or whether the user is indicating that the user seeks additional information on the portion of the e-book the user is reading. For example, a user may be reading an e-book placed on a desk with an AR/VR headset on. A pass-through camera feature may allow the user to read an e-book while having the AR/VR headset on. In some implementations, the user may be reading a physical paper book using the pass-through camera feature. In other implementations, the user may be reading an e-book rendered on the AR/VR headset itself. The computer system may allow the user, through the AR/VR headset, to flip the virtual pages rendered on the screen of the AR/VR headset. In some embodiments, the computer system may continuously track the user's head movement or additionally, eye movement while the user reading a physical book or an e-book one way or the other.

In a next step 503, the computer system may determine that the user seeks augmented reality/virtual reality content associated with a portion of the rendered e-book. For example, based upon tracking the head movement (and optionally, eye movement), the computer may determine that the user has taken eyes off the e-book the user is reading and has looked up. Based upon one or more configuration setting, the computer system may determine that this gesture indicates that the user is seeking additional information. In some implementations, the user may provide one or more inputs to indicate that the user needs the user needs additional augmented reality (AR)/virtual reality (VR) content about the portion of the e-book that the user is reading. One having ordinary skill in the art understands that the aforementioned inputs to the computer systems and merely exemplary and other forms of inputs are to be considered within the scope of this disclosure.

In a next step 504, the computer system may query a database to retrieve augmented reality/virtual reality content for the portion associated with the portion of the rendered e-book. For example, computer system may query the e-book database which may contain additional augmented reality information. For the query, the computer system may use an identifier of the portion of the rendered e-book. For example, the computer system may use the page number, a paragraph number, a section number, and/or any other information to identify the portion of the rendered e-book the user is reading. In the embodiments wherein the user is reading a paper-book or a an e-book on a separate device than the AR/VR headset, the computer system may use a camera of the AR/VR headset to determine the portion of the book the user is reading.

In a next step 505, the computer system may render the retrieved augmented reality/virtual reality material through the augmented reality/virtual reality headset. The AR/VR reality material may include items such pictures, sketches, videos, and/or maps. For example, if a user is reading a portion of the e-book detailing a battle in a war, the AR/VR material may include map of the battlefield, photographs of the soldiers and officers, and sketches of the weapons used. As an another example, if the user is reading a book about electric motors, the AR/VR headsets may display a three dimensional picture of the motor. Using the interaction tools of the AR/VR headsets, the user may interact with the three dimensional picture. For example, the user may rotate, zoom in, and zoom out of the three dimensional picture.

In some embodiments, the computer system may query for and retrieve and render the additional AR/VR material (or content) on a payment basis. For example, the user may have to pay for the additional AR/VR material and the computer system may communicate with a payment processing server to process the required user payment prior to querying for, retrieving, and rendering the additional AR/VR material. To process the payment, the computer system may query by the computer, a payment database to retrieve payment information about the user. The computer may transmit the payment information to a payment server. The computer may retrieve the additional AR/VR material in response to receiving a confirmation message from the payment server.

Figure 6:
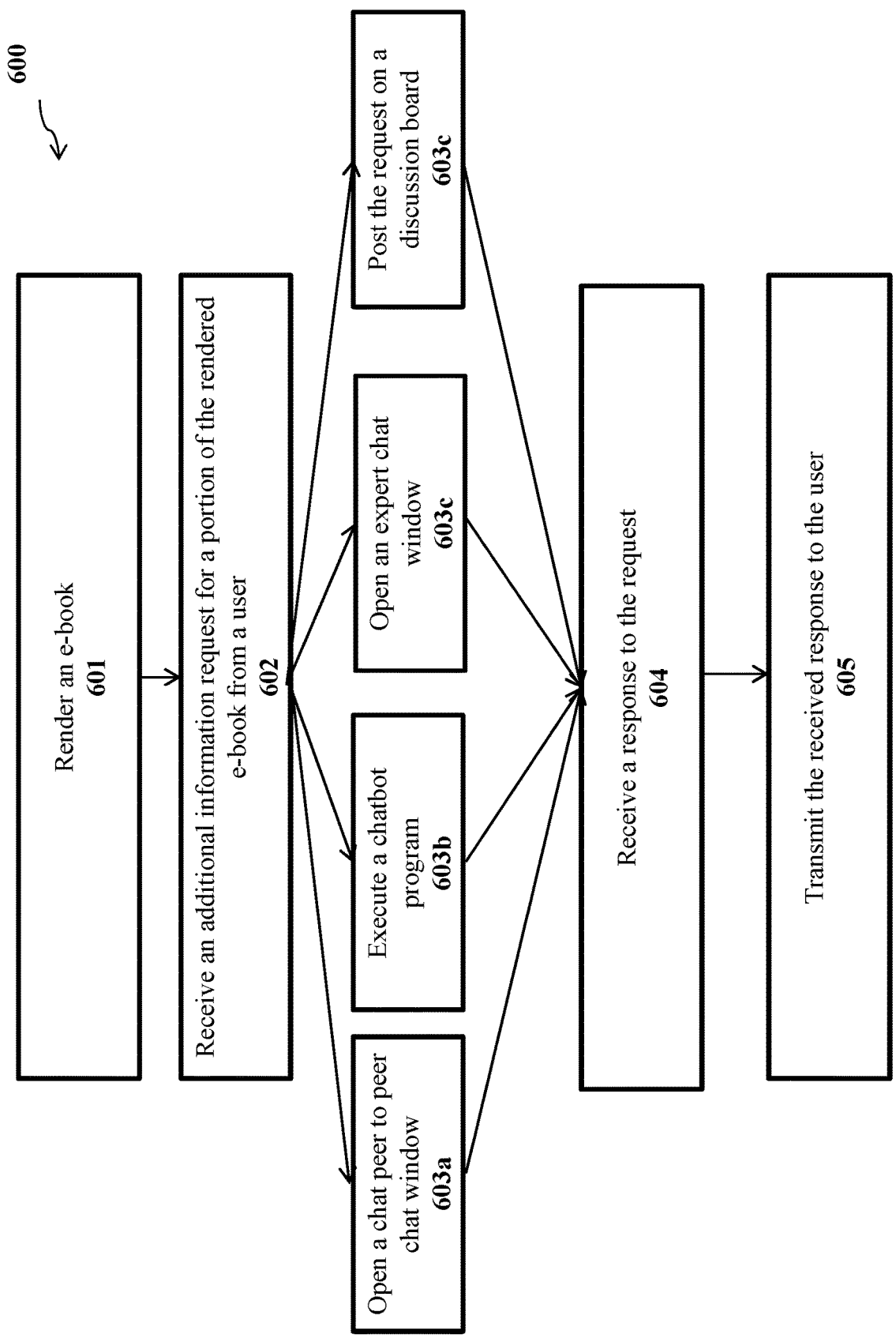
FIG. 6 shows an exemplary method of implementing a virtual book club in association with an e-book, according to an exemplary embodiment.

FIG. 6 shows an exemplary method 600 of integrating computer based social interaction in with e-books, according to an exemplary embodiment. Although multiple computer systems and multiple databases may implement the various steps of the method 600, the following description describes, for brevity, a computer system and a database implementing the method 600. One having ordinary skill in the art understands that the computer system and the database may be on the server side, on the client side, and/or a combination of the server side and the client side. One having ordinary skill in the art further understands the one or more steps of the method 600 may be omitted or substituted and other steps may be added to the method 600 without deviating from the scope of this disclosure.

In a first step 601, the computer system may render an e-book. The computer system may render the e-book on a user device such as a smartphone, a tablet computer, a laptop computer, a desktop computer, or a dedicated e-book reader. Furthermore, the computer system may customize the e-book based on the user profile and preferences stored in the database. For example, the computer system may highlight one or more portions of the book.

In a next step 602, the computer system may receive an additional information request for a portion of the rendered e-book from a user. For example, the user may make a chat request through an object rendered on the screen of the user device or by pressing a physical button in the user device. In some embodiments, the chat request may be a request to chat with other readers who are reading the same portion at the same time. Based on the request, the computer system may open chat windows overlaid on other user devices rendering the same portion of the e-book being read by the user. Using the chat window, the user and other users may chat about the rendered portion of the book.

In some embodiments, the chat request may include a request to chat with an expert. In these embodiments, the computer system upon receipt of the request, ping the devices of one or more expert user. When an expert user responds, the computer system may facilitate a chat between the user and the expert user. When an expert is not available, the computer system may initialize a chatbot to chat with the user. In some embodiments, the chat request may include a request to chat with the chatbot itself. In some embodiments, the chat request may be a question with an indication from the user that the question does not have to be answered immediately. In such embodiments, the computer system may receive the question and transmit the question to one or more experts. After an expert answers the question, the computer system may then transmit the answer to the user. In some embodiments, the information request may include the user indicating to the computer system to post the question in a discussion board.

The computer system may execute one or more of the steps 603*a*, 603*b*, 604*c*, 603*d* based on the type of the chat request. If the request from the user is to chat with other users who may be reading the same book, the computer system execute step 603*a* to open a peer to peer chat window in the user's device. Furthermore, the computer system may also open a peer to peer chat window on the other users' devices based upon the respective configuration settings. If the chat request is to initiate a chatbot, the computer system may execute step 603*b* to initiate a chatbot program. In some embodiments, the computer system may initiate a chatbot program if the user requests a peer to peer chat and the computer system determines that there is no one available for a chat. If the chat request is to open an expert chat window, the computer system may execute step 603*c* to open an expert chat window. For example, once the user inputs the request, the computer system may ping one or more experts to ascertain whether they are available for guiding the user. Then, the computer system may open an expert chat window for an expert who has indicated that he or she is available for a chat with the user. If the request is to post a question on a discussion board, the computer system may execute step 603*c* to post the question input by the user on a discussion board. One having ordinary skill in the art understands that these aforementioned chat requests are merely exemplary and other forms of user requests should also be considered to be within the scope of this disclosure.

In a next step 604, the computer system may receive a response to the request. For a peer to peer chat, the computer system may receive one or more answers inputted by one or more other users in one or more peer to peer chat windows. For a chatbot, the computer system may receive one or more answers generated by the chatbot. For an expert chat, the computer system may receive one or more answers from one or more experts. For a request posted on a discussion board, the computer system may receive one or more answers posted on the discussion board. One having ordinary skill in the art understands that the aforementioned modes of receiving one or more answers to the request are merely exemplary and other modes of receipt are to be considered within the scope of this disclosure.

In a next step 605, the computer system may transmit the received response to the user. In some embodiments, the computer system may render the response on the peer to peer chat window on the user's device. In some embodiments, the computer system may transmit an e-mail or text message with the response. In other embodiments, the computer system may transmit an indication through e-mail, text message, or similar modes of communication that a response has been posted and that the user has to open the e-book to view the response. One having ordinary skill in the art understands that these modes of transmissions are merely exemplary and other modes of transmission are to be considered within the scope of this disclosure.

Therefore, by implementing this exemplary method 600, the computer system may leverage social communication aspects to aid the user understand the e-book material. For example, if the user is reading a particularly complex text, the computer system provides multiple options to the users to seek help from fellow peers, experts, or an automated artificial intelligence (AI) based chatbot program. Furthermore, in a classroom setting, the computer system may automatically tag a portion of an assigned reading based upon the number of chat requests made by the student users. The computer system may then indicate to professor who has assigned the reading that the tagged portions were particularly difficult for the students, and automatically queue the material for the professor to address in a subsequent lecture.

Figure 7:
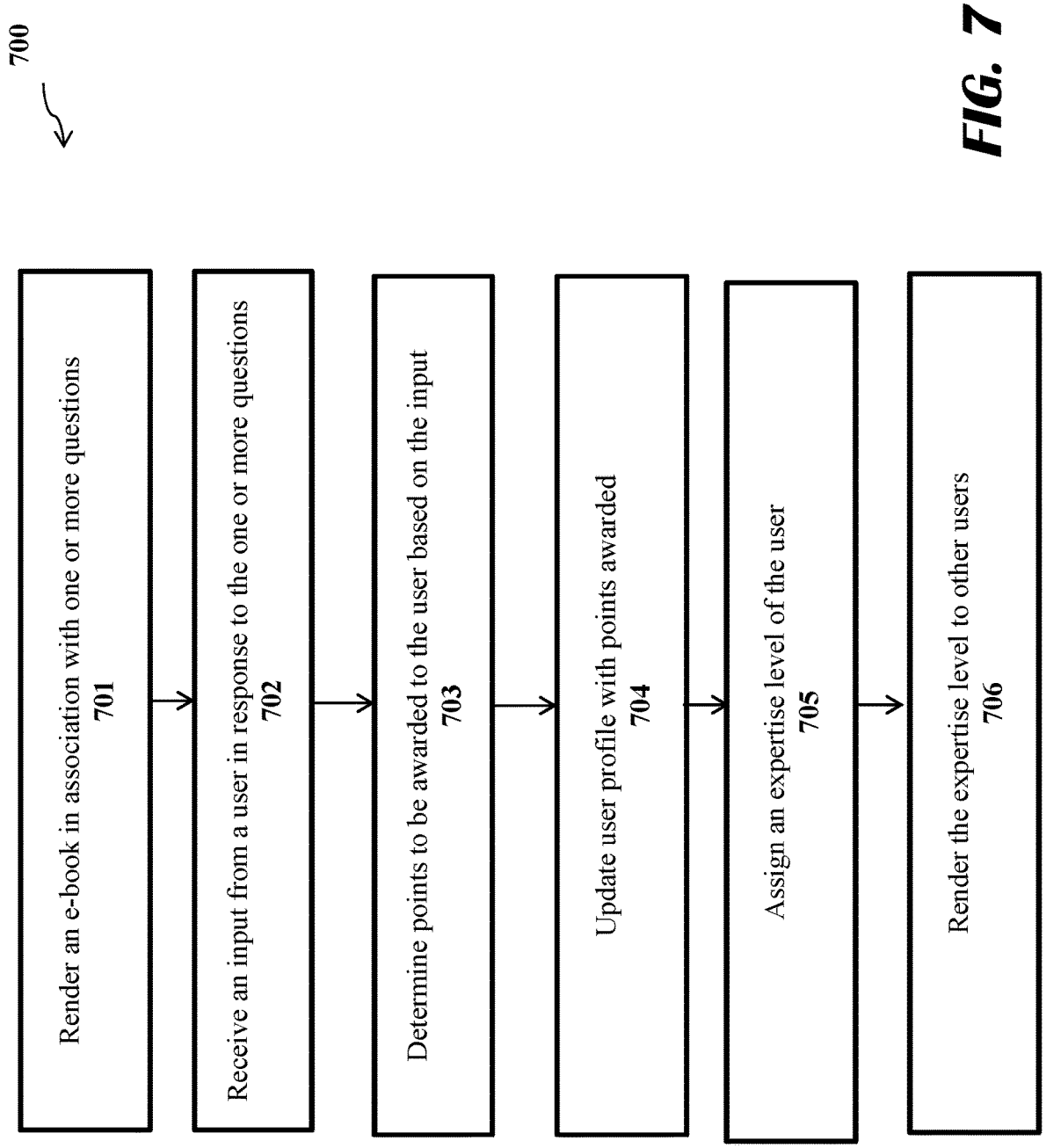
FIG. 7 shows an exemplary method of assigning one or more expertise levels, according to an exemplary embodiment.

FIG. 7 shows an exemplary method 700 of providing rewards to a user, according to an exemplary embodiment. Although multiple computer systems and multiple databases may implement the various steps of the method 700, the following description describes, for brevity, a computer system, an e-book database, and a user database implementing the method 700. One having ordinary skill in the art understands that the computer system and the databases may be on the server side, on the client side (for example an e-book reader), and/or a combination of the server side and the client side. One having ordinary skill in the art further understands the one or more steps of the method 700 may be omitted or substituted and other steps may be added to the method 700 without deviating from the scope of this disclosure.

In a first step 701, the computer may render an e-book in association with one or more questions. The computer may render a customized e-book based on the user profile. The rendered e-book may include, for example, a section of a book overlaid with a question posed by one or more users. As an alternate, the rendered e-book may include a chat window with chats from various users being updated in real time. As another alternate, the rendered e-book may include one or more questions at a discussion forum. In some embodiments, the computer may render the additional contents such as the chats being updated in real time, a question posed, or a forum discussion based on a request from the user. For instance, the computer may render the text and/or pictures of the book, and the user may use a menu item on the screen or a physical button on the user device instructing the computer to render the additional contents of the e-book. In some implementations, the user device may be associated with a user, and the computer may render the additional content overlaid on the e-book based on the user profile stored in the database. For example, the user may indicate that he or she is an expert user in the user profile, and based on such indication, the computer system may automatically load the additional content on the overlaid on the e-book.

In a next step 702, the computer may receive an input from the user in response to the one or more questions. The input may be associated with one or more additional contents overlaid on the e-book. The input may be, for example, an answer to the question posed in a discussion forum or a response to a question in the chat room. In some implementations, the input may be an audio or the video of the user providing answers to one or more questions posed in the online forum and chat rooms. For example, the user may instruct the user device to activate the camera and/or microphone to take videos and/or an audio. Then the user may instruct the computer to upload the video and/or audio in association to the respective question posed.

In a next step 703, the computer may determine points to be awarded to the user based on the input. In some embodiments, the computer may determine the points based upon other users' response to the answers provided the user. For example, the computer may post the responses by the user with an option for other users to indicate whether the response was helpful. Alternatively, the computer may allow the other users to rank the response, either qualitatively or numerically or both. For example, the computer may request the other users to input a number on a ten-point scale. As another example, the computer may request the other users to select from options such as extremely helpful, very helpful, helpful, somewhat helpful, and not helpful. The computer may receive the ranking inputs from the community of users and determine the points to be awarded to the user. For example, the computer may determine that higher value points may be awarded to the user whose responses receive higher rankings. Likewise, the computer may determine that lower value points to be awarded to the user whose response receive lower rankings. In some implementations, the computer may determine the points to awarded to the user agnostic to the inputs receives from other users. For example, the computer system may determine the points to be awarded based upon the number of responses from the user irrespective of how the responses were ranked by the community of users. In a next step 704, the computer system may update the user database with the reward with the points awarded. The computer may, for example, update a rewards account associated with the user's profile with the points awarded to the user.

In a next step 705, the computer system may assign the expertise level of the user. In some embodiments, the computer system may assign the expertise level based on the award points. For example, the higher number of award points may be correlated with the better and credible answers and lower number of award points may be correlated with lower quality and less credible answers. The computer system may therefore implement a numerical threshold to delineate the expertise of the user. In some embodiments, the computer system may assign the expertise level based on the aggregated rankings of the answers received from other users. The expertise levels assigned by the computer systems may include labels such as "expert" or "beginner."

In a next step 706, the computer system may render the expertise level to other users. For example, next to the name of the expert, the computer may have a color coded message, or a badge identifying the expert and the level of the expert. For example, a chat window, the computer system may display the name or identifier of a user with a badge or an indication of the expertise level of the user. Similarly, in discussion forums, the computer system may render the name or an identifier of the expert with a badge or an indication of the expertise level of user in combination with the answer posted by the user.

One having ordinary skill in the art understands that badges or any other type of indication of the expertise level of the user may provide a signal of credibility to other users. Furthermore, the reward mechanism also may provide an incentive for user to provide answers to various questions posed by other users such that reading can be a collaborative environment. Or in other words, the computer system may provide a virtual book club wherein users can discuss about one or more e-books and ask questions to one or more experts.

Figure 8:
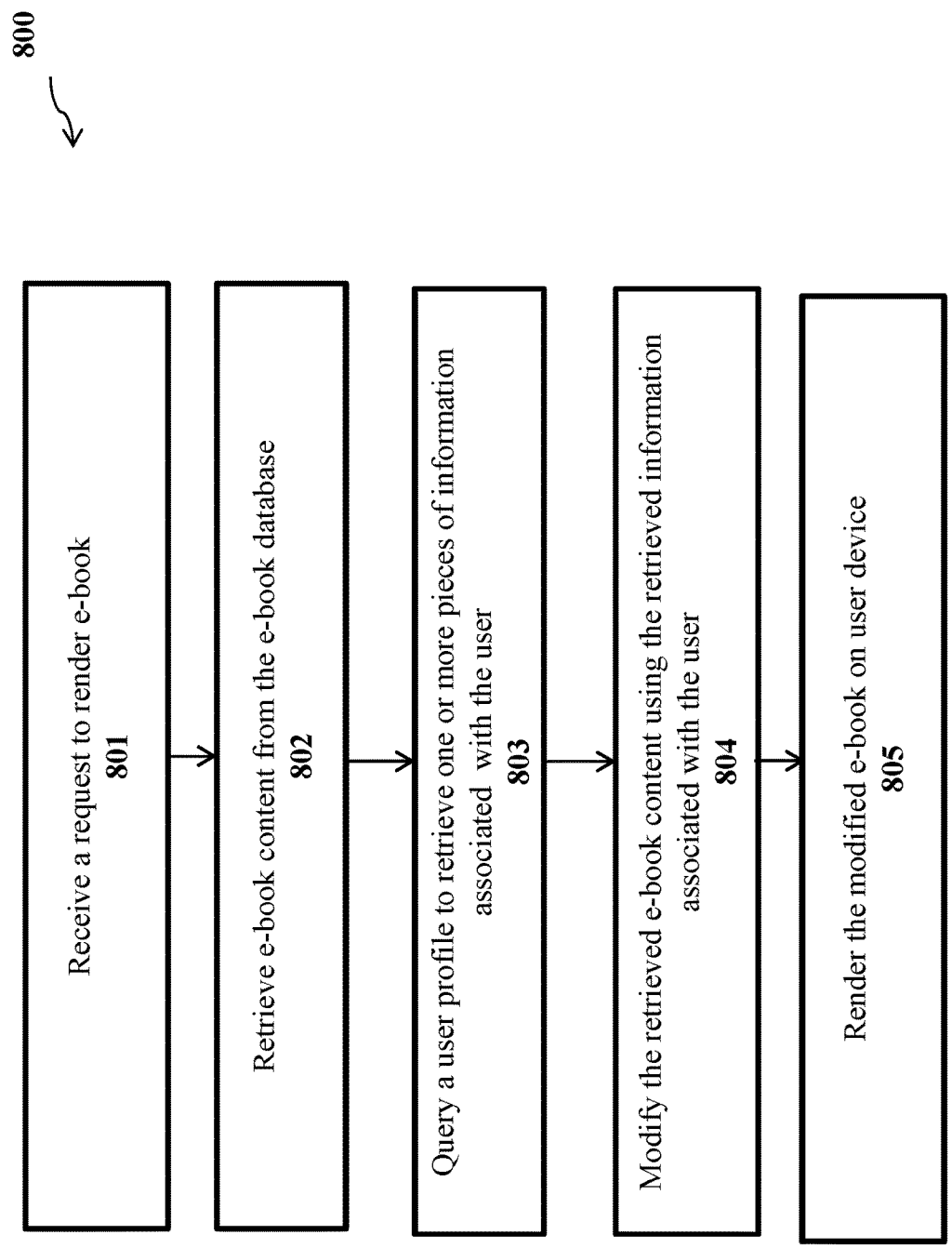
FIG. 8 shows an exemplary method of rendering a customized e-book on a user device, according to an exemplary embodiment.

FIG. 8 shows an exemplary method 800 of rendering a customized e-book to a user, according to an exemplary embodiment. Although multiple computer systems and multiple databases may implement the various steps of the method 800, the following description describes, for brevity, a computer system, an e-book database, and a user database implementing the method 800. One having ordinary skill in the art understands that the computer system and the database may be on the server side, on the client side (for example an e-book reader), and/or a combination of the server side and the client side. One having ordinary skill in the art further understands the one or more steps of the method 800 may be omitted or substituted and other steps may be added to the method 800 without deviating from the scope of this disclosure.

In a first step 801, the computer system may receive a request to render an e-book. For example, a user may transmit a request via a user device such as a dedicated e-book reader, a smartphone, a tablet computer, a laptop computer, and a desktop computer. On the user device, the user may press a physical button to transmit the request. In addition or in the alternate, the user may select one or more options presented on the user interface of the user device to transmit the request. For example, the computer system may render an icon of an e-book on the user device, and the user may select the icon to transmit a request to the computer system to render the e-book associated with the selected icon. In some embodiments, the user may use the voice assistance feature of the user device to transmit the request to render the e-book. One having ordinary skill in the art understands that the aforementioned request mechanisms are merely exemplary, and other forms of requesting an e-book to be rendered are to be considered within the scope of this disclosure.

In a next step 802, the computer system may retrieve the e-book contents from the e-book database. For example, the computer system may retrieve one or more customizable e-book files from the e-book database. The contents of the customizable e-book files may include, for example, text, pictures, sketches, photographs, or moving pictures to be rendered with the text of the e-book. The e-book database be stored on a server computer or the user device or a combination of both. The request from the user may include an e-book identifier and the computer system may use the e-book identifier to retrieve the e-book contents associated with the e-book identifier.

In a next step 803, the computer may query a user profile associated with the user to retrieve one or more pieces of information associated with the user. The user profile may be stored in the user database and may contain one or more data records containing a plurality of pieces of information of the user. The plurality of pieces of information of the user may include, the user's name, the user's one or more social media handles, the user's profession, the user's photograph or likeness, the user's hobbies, the user's friends and relatives, and the user's favorite food. The computer system may source the aforementioned and other information of the user from sources such as the user's social media, the user's blog site, and/or any other type of online activities from the user. The computer system may source the information using the respective application programming interface (API) of the respective online service providers such as social media platforms and the blog hosting sites. The user profile may include user authentication information, for example username and password, and the computer system may use such authentication information to query one or more social media platforms and/or blogging platforms to retrieve the information about the user. After the queried information is received from the online service providers, the computer system may execute one or more analytics engines to aggregate the pieces of information received from one or more online service providers. In some implementations, the computer system may receive one or more pieces from the user himself or herself. Furthermore, the computer system may determine a close circle of friends and family of the user, and use the information to autopopulate the name of close family and friends of the main character in the rendered e-book.

In a next step 804, the computer may modify the retrieved e-book content using the retrieved information associated with the user. For example, the computer system may execute a modification algorithm on the one or more customizable e-book files and the aggregated pieces of information generated by the analytics engine to generate a customized e-book. For instance, if the e-book is a fiction, the computer system may replace the name of the main character with the name of the user. Furthermore, the computer system may replace the attributes of the main character with the attributes of the user. For example, if the user has a favorite food or a favorite drink, the computer system may modify the e-book content such that the favorite food and/or the favorite drink of the main character is respective the favorite food and the favorite drink of the user. In some implementations, wherein the e-book may include pictures or likeness of the characters, the computer system may modify the e-book content such that the main character looks like the user. In the embodiments wherein the user submits a photograph, the computer system may execute one or more photograph processing algorithms to generate a sketch of the user from the submitted photo and use the generated sketch as the likeness of the main character in the e-book. In some embodiments, the computer may modify the e-book content using the information of the user's friend and family. For example, the computer system may use the user's children's name as the name of the main character's children in the e-book. Furthermore, the computer system may use the photographs of the user's children to generate the likeness of the children of the main character in the e-book. A person having ordinary skill in the art understands that the pieces of information and modifications discussed herein are merely exemplary and other pieces of information and modifications should be considered within the scope of this disclosure.

In a next step 805, the computer system may render the modified e-book on user device. The modified e-book therefore will contain information about the user embedded within the narrative presented by the e-book. The modified e-book may therefore be particularly helpful for reading to children where the children may feel that they are a part of the story. Such e-books may be equally interesting to adults as well.

Figure 9:
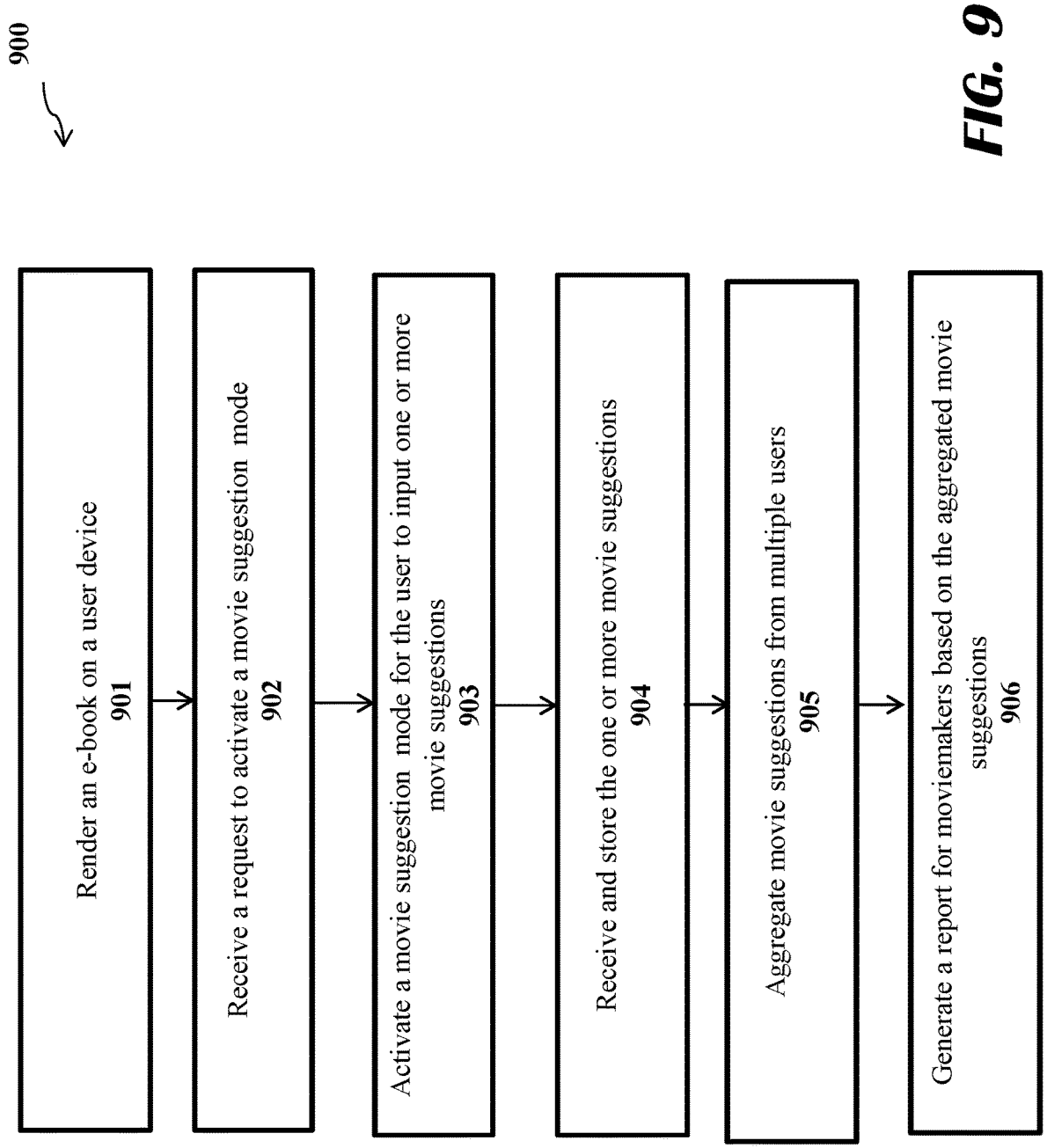
FIG. 9 shows an exemplary method of allowing a user to provide feedback on an e-book, according to an exemplary embodiment.

FIG. 9 shows an exemplary method 900 of aggregating e-book readers' suggestions for future movies based on the rendered e-books, according to an exemplary embodiment. Although multiple computer systems and multiple databases may implement the various steps of the method 900, the following description describes, for brevity, a computer system and a database implementing the method 900. One having ordinary skill in the art understands that the computer system and the database may be on the server side, on the client side, and/or a combination of the server side and the client side. One having ordinary skill in the art further understands the one or more steps of the method 900 may be omitted or substituted and other steps may be added to the method 900 without deviating from the scope of this disclosure.

In a first step 901, the computer system may render an e-book on a user device. The user device may include, for example, a dedicated e-book reader, a tablet computer, a laptop computer, and/or a desktop computer. As described herein, the computer system may be a server computer or the user device or a combination of the server computer and the user device. In some embodiments, the rendered e-book may be a customized e-book based on the user associated with the user device. For example, the computer system may receive a request to render the e-book through the user device and based on the identification of the user device may retrieve the user profile of the user. Based on the user profile, the computer system may render a customized e-book such as e-book with the reading level associated with the user. As another example, the computer system may highlight portions of the rendered e-book based on the user profile. Furthermore, the customer system may render customized graphic elements, pictures and sketches for example, based on one or more data records stored in the user profile.

In a next step 902, the computer system may receive a request to activate a movie suggestion mode. The computer system may receive the request from the user device. For example, the user device may include a physical button that the user can press to make the request. In addition or in the alternate, the computer system may render a selectable object (e.g. an icon or a link) in the user interface of the user that the user may select to transmit the request. In some embodiments, the user device may capture a voice request from the user and the computer system may process the voice request to determine if the voice request includes the request to activate the movie suggestion mode. One having ordinary skill in the art understands that these request mechanisms and merely exemplary and other forms of request should be considered to be within the scope of this disclosure. The movie suggestion mode may allow the user to input one or more suggestions by the user for a future movie based on the rendered e-book or a portion thereof.

In some embodiments, the request to activate a movie suggestion mode may be associated with a specific portion of the rendered e-book. For example, the user may select a portion of the e-book rendered in the user device and provide an input to the user device (for example a right-click) to open options for the selected portion. Among the options, the computer system may render an option such as "enter a movie suggestion for this portion." The user may select the option and the computer system may active a move suggestion mode associated at least with the user selected portion.

In a next step 903, the computer system may activate a movie suggestion mode for the user to input one or more movie suggestions. The move suggestion mode may include, for example, one or more windows overlaid on the rendered e-book. The one or more windows may allow the user to enter inputs for movie suggestion such a typing a text, recording an audio or a video, and/or uploading pictures/text. In some implementations, the movie suggestion mode may include audio cues for the user to input the movie suggestions. The move suggestions may include for example, a recommended street for shooting a scene in the e-book, a potential actor for a character in the book, and/or a recommended town for shooting the move based on the book. One having ordinary skill in the art realizes that these suggestions are merely exemplary and other unlisted suggestions should be considered to be within the scope of this disclosure.

In a next step 904, the computer system may receive and store the one or more movie suggestions. In some embodiments, the computer system may initially store the one or more movie suggestions in a local database in the user device and transmit the one or more movie suggestions to the server computer at a later time. In other embodiments, the computer system may transmit the one or more movie suggestions directly to the server computer without storing in a local database. The server computer may then store the one or more movie suggestion in a database associated with the server computer.

In a next step 905, the computer system may aggregate movie suggestions from multiple users. For example, the server computer may maintain a separate database of movie suggestions where the computer system stores the movie suggestions from multiple users. The computer system may execute one or more analytics engines on the data records in the database of movie suggestions. For database records containing text suggestions from the users, the computer system may execute a text analytics engine to ascertain common themes or suggestions. For database records containing audio and/or video suggestions, the computer system may execute an audio/video analytics engine to ascertain common words, phrases, and/or sentences. One having ordinary skill in the art appreciates that these techniques of analytics and aggregation are merely exemplary and other types of analytics engines and techniques should be considered within the scope of the disclosure.

In a next step 906, the computer system may generate a report for moviemakers based on the aggregated movie suggestions. For example, one or more analytics engine during aggregation may generate a list of suggested shooting locations for a particular scene in an e-book. The report may include the list with items in the linked ranked according to their popularity. As another example, the report may include a ranked list of suggested actors for a particular role. The report may include, for example, text, info-graphics, and charts. Based on the report, moviemakers may gaze as to how the readers want the e-book to be visualized in the movies.

In addition to providing suggestions to future moviemakers, one or more users may provide feedback to an author of the rendered e-book using the exemplary method 900. For example, an user may tag a portion that he or she likes and tag another portion that he or she does not like. As another example, the user may indicate alternate plots or ideas for a sequel. Furthermore, the user may indicate one or more stories in the fan fiction market associated with the rendered e-book. The computer system may therefore facilitate an author to dynamically write a book based on reader feedback. For example, an author can publish a chapter using the computer system, and dynamically write subsequent chapters based on the user feedback.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer implemented method comprising:
retrieving, by a computer, an e-book file containing an e-book content and displaying the e-book content on a graphical user interface of the computer;
continuously tracking, by the computer through an augmented reality (AR) headset, head movement of a user while reading the e-book content;
upon receiving an indication by the computer that the AR headset has captured a head gesture indicating that the user wants additional AR content associated with the displayed e-book content, wherein the head gesture comprises the user looking away from the displayed e-book content:
identifying, by the computer, a portion of the displayed e-book content based on an image of the displayed e-book content captured by a camera of the AR headset;
querying, by the computer, an additional content database to retrieve additional AR content associated with the portion of the displayed e-book content, whereby the retrieved additional AR content is a visual element of the content of the identified portion of the e-book file that is displayed via the AR headset, the additional AR content further defining the content of the identified portion of the e-book file; and transmitting, by the computer, the retrieved additional AR content to be displayed on a screen of the AR headset.

2. The method of claim 1, wherein the computer is selected from the group consisting of: a dedicated e-book reader, a tablet computer, a smartphone, a laptop computer, and a desktop computer.

3. The method of claim 1, wherein additional AR content is selected from the group consisting of video, picture, sketch, photograph, audio, and a map.

4. The method of claim 1, wherein the e-book file is in a format selected from the group consisting of: plaintext, a Portable Document Format (PDF), Hypertext Markup Language (HTML), Extensible Markup Language (XML), Microsoft Word (MS-Word), International Electrotechnical Commission (IEC) 62448 standard, Information Presentation Facility (IPF), Kindle File Format, Mobipocket, Rich Text Format (RTF), and Open XML Paper Specification (OpenXPS).

5. The method of claim 1, further comprising:
querying, by the computer, a payment database to retrieve payment information about the user;
transmitting, by the computer, the payment information to a payment server; and
retrieving, by the computer, the additional AR content in response to receiving a confirmation message from the payment server.

6. The method of claim 1, wherein the head gesture indicating that the user wants additional AR content includes the user looking up from the e-book content.

7. The method of claim 1, further comprising:
continuously tracking, by the computer through the AR headset, eye movement of a user while reading the e-book content.

8. The method of claim 1, further comprising:
transmitting, by the computer, at least a portion of the e-book file to the AR headset such that the AR headset displays a corresponding portion of the e-book content on the screen of the AR headset.

9. The method of claim 1, further comprising:
receiving, by the computer, orientation information from a gyroscope or an accelerometer of the AR headset; and
continuously tracking, by the computer, the head movement of a user while reading the e-book content based on the orientation information.

10. A system comprising:
a non-transitory storage medium configured to store a plurality of e-book files and an additional content database;
a processor connected to the non-transitory storage medium and configured to:
retrieve from the non-transitory medium, an e-book file containing an e-book content and display the e-book content on a graphical user interface;
continuously track computer through an augmented reality (AR) headset, head movement of a user while reading the e-book content;
upon receiving an indication by the processor that the AR headset has captured a head gesture indicating that the user wants additional AR content associated with the displayed e-book content, wherein the head gesture comprises the user looking away from the displayed e-book content:
identify a portion of the displayed e-book content based on an image of the displayed e-book content captured by a camera of the AR headset;
query the additional content database to retrieve additional AR content associated with the portion of the displayed e-book content, whereby the retrieved additional AR content is a visual element of the content of the identified portion of the e-book file that is displayed via the AR headset, the additional AR content further defining the content of the identified portion of the e-book file; and
transmit the retrieved additional AR content to be displayed on a screen of the AR headset.

11. The system of claim 10, wherein the processor is in a device is selected from the group consisting of: a dedicated e-book reader, a tablet computer, a smartphone, a laptop computer, and a desktop computer.

12. The system of claim 10, wherein additional AR content is selected from the group consisting of video, picture, sketch, photograph, audio, and a map.

13. The system of claim 10, wherein the e-book file is in a format selected from the group consisting of: plaintext, a Portable Document Format (PDF), Hypertext Markup Language (HTML), Extensible Markup Language (XML), Microsoft Word (MS-Word), International Electrotechnical Commission (IEC) 62448 standard, Information Presentation Facility (IPF), Kindle File Format, Mobipocket, Rich Text Format (RTF), and Open XML Paper Specification (OpenXPS).

14. The system of claim 10, wherein the processor is further configured to:
query a payment database to retrieve payment information about the user;
transmit the payment information to a payment server; and
retrieve the additional AR content in response to receiving a confirmation message from the payment server.

15. The system of claim 10, wherein the head gesture indicating that the user wants additional AR content includes the user looking up from the e-book content.

16. The system of claim 10, wherein the processor is further configured to:
continuously track through the AR headset, eye movement of a user while reading the e-book content.

17. The system of claim 10, wherein the processor is further configured to:
transmit at least a portion of the e-book file to the AR headset such that the AR headset displays a corresponding portion of the e-book content on the screen of the AR headset.

18. The system of claim 10, wherein the processor is further configured to:
receive orientation information from a gyroscope or an accelerometer of the AR headset; and
continuously track the head movement of a user while reading the e-book content based on the orientation information.

19. A computer readable non-transitory medium containing one or more computer instructions, which when executed by a processor cause the processor to:
retrieve an e-book file containing an e-book content and display the e-book content on a graphical user interface;
continuously track computer through an augmented reality (AR) headset, head movement of a user while reading the e-book content;
upon receiving an indication by the processor that the AR headset has captured a head gesture indicating that the user wants additional AR content associated with the displayed e-book content, wherein the head gesture comprises the user looking away from the displayed e-book content:

identify a portion of the displayed e-book content based on an image of the displayed e-book content captured by a camera of the AR headset;

query an additional content database to retrieve additional AR content associated with the portion of the displayed e-book content, whereby the retrieved additional AR content is a visual element of the content of the identified portion of the e-book file that is displayed via the AR headset, the additional AR content further defining the content of the identified portion of the e-book file; and transmit the retrieved additional AR content to be displayed on a screen of the AR headset.

20. The computer readable non-transitory medium of claim 19, wherein the e-book file is in a format selected from the group consisting of: plaintext, a Portable Document Format (PDF), Hypertext Markup Language (HTML), Extensible Markup Language (XML), Microsoft Word (MS-Word), International Electrotechnical Commission (IEC) 62448 standard, Information Presentation Facility (IPF), Kindle File Format, Mobipocket, Rich Text Format (RTF), and Open XML Paper Specification (OpenXPS).

* * * * *